United States Patent [19]

Shiho

[11] Patent Number: 4,993,009

[45] Date of Patent: Feb. 12, 1991

[54] OPTO-MAGNETIC RECORDING APPARATUS WITH A BIAS MAGNETIC FIELD GENERATING MEANS MOVABLE PARALLEL TO A RECORDING SURFACE OF A RECORDING MEDIUM

[75] Inventor: Makoto Shiho, Yokohama, Japan

[73] Assignee: Canon Kabushiki Kaisha, Tokyo, Japan

[21] Appl. No.: 501,440

[22] Filed: Mar. 22, 1990

Related U.S. Application Data

[63] Continuation of Ser. No. 71,082, Jul. 8, 1987, abandoned.

[30] Foreign Application Priority Data

Jul. 14, 1986 [JP] Japan .................. 61-165067

[51] Int. Cl.⁵ .................. G11B 13/04; G11B 11/12; G11B 11/10
[52] U.S. Cl. .................. 369/13; 360/114; 360/137
[58] Field of Search .................. 369/13, 261, 270, 271, 369/194; 360/114, 59, 97, 137, 99; 365/122

[56] References Cited

U.S. PATENT DOCUMENTS

| | | | |
|---|---|---|---|
| 4,472,796 | 9/1984 | Torrington | 369/77.2 |
| 4,479,210 | 10/1984 | Nakayama | 369/261 |
| 4,564,930 | 1/1986 | Funabashi et al. | 369/270 |
| 4,574,372 | 3/1986 | de Costemore d'Arc | 369/244 |
| 4,597,018 | 6/1986 | Sonobe et al. | 358/296 |
| 4,636,450 | 1/1987 | Ogawa et al. | 430/84 |
| 4,686,661 | 8/1987 | Isaka | 369/13 |
| 4,706,232 | 11/1987 | Funada et al. | 369/13 |
| 4,740,937 | 4/1988 | Watanabe | 369/13 |
| 4,740,948 | 4/1988 | Nakamori et al. | 369/291 |
| 4,748,606 | 5/1988 | Naito et al. | 360/114 |

FOREIGN PATENT DOCUMENTS

| | | |
|---|---|---|
| 0135969 | 3/1985 | European Pat. Off. . |
| 0180459 | 8/1986 | European Pat. Off. . |
| 0192470 | 8/1986 | European Pat. Off. . |
| 0201885 | 11/1986 | European Pat. Off. . |
| 3342525 | 5/1984 | Fed. Rep. of Germany . |
| 58-150963 | 9/1983 | Japan . |
| 60-147949 | 8/1985 | Japan .................. 360/114 |
| 60-226044 | 11/1985 | Japan . |
| 60-234251 | 11/1985 | Japan . |
| 60-251541 | 12/1985 | Japan . |
| 61-96540 | 5/1986 | Japan .................. 360/114 |
| 61-160851 | 7/1986 | Japan . |
| 61-278058 | 12/1986 | Japan .................. 360/114 |
| 1466809 | 3/1977 | United Kingdom . |
| 2106696 | 4/1983 | United Kingdom . |
| 2117162 | 10/1983 | United Kingdom . |
| 2127205 | 4/1984 | United Kingdom . |
| 2132807 | 7/1984 | United Kingdom . |
| 2152267 | 7/1985 | United Kingdom . |

OTHER PUBLICATIONS

Ojima, et al., "Compact Magnetooptical Disk for Coded Data Storage", Applied Optics, 2/1986, vol. 25, No. 4, pp. 483–489.

Primary Examiner—Stuart S. Levy
Assistant Examiner—Hoa Nguyen
Attorney, Agent, or Firm—Fitzpatrick, Cella, Harper & Scinto

[57] ABSTRACT

An opto-magnetic recording apparatus for radiating a light beam onto an opto-magnetic recording medium. The opto-magnetic recording apparatus includes a magnet for generating a magnetic field for biasing the opto-magnetic recording medium while the same is irradiated by light, thereby recording information thereon. The opto-magnetic recording apparatus is adapted to receive the opto-magnetic recording medium in a direction extending substantially along a recording surface of the opto-magnetic recording medium. The opto-magnetic recording apparatus further includes a mechanism for removing the magnet from an insertion path when the opto-magnetic recording medium is inserted.

7 Claims, 4 Drawing Sheets

OPTO-MAGNETIC RECORDING APPARATUS WITH A BIAS MAGNETIC FIELD GENERATING MEANS MOVABLE PARALLEL TO A RECORDING SURFACE OF A RECORDING MEDIUM

This application is a continuation of prior application Ser. No. 07/071,082 filed July 8, 1987, now abandoned.

BACKGROUND OF THE INVENTION

1. Field of the Invention

The present invention relates to an opto-magnetic recording apparatus for performing recording, reproduction, and erasure of information with respect to an opto-magnetic recording medium by cooperation of a light beam and a magnetic field.

2. Related Background Art

The above opto-magnetic recording media include disk- and card-like media. In the following description, a disk-like opto-magnetic recording medium (to be referred to as an opto-magnetic disk, hereinafter) will be exemplified.

In an opto-magnetic disk, a magnetic thin film having an axis of easy magnetization perpendicular to the film surface is formed on a substrate. Information can be recorded in accordance with a change in magnetization direction of the magnetic thin film. In the recording mode, magnetization of the magnetic thin film is aligned in one direction, and the magnetic thin film is irradiated with a laser beam digitally modulated with an information signal, while a bias magnetic field is applied to the disk in a direction opposite to the magnetization direction. A temperature of a portion irradiated with the laser beam is increased and thus, a coersive force thereof is decreased. The magnetic thin film is magnetized in a direction in the opposite direction by the bias magnetic field, thereby forming a magnetization pattern according to the information. Information recorded in the opto-magnetic disk in this manner can be optically readout upon radiation of a low-power nonmodulated beam on the medium according to a known magneto-optical effect. In addition, information can be erased when a magnetic field, having a direction opposite to the bias magnetic field applied in the recording mode, is applied to the magnetic thin film.

FIG. 1 is a schematic view showing a conventional opto-magnetic recording apparatus using such an opto-magnetic disk. An upper cover 42 is mounted on a frame 41 of the apparatus and is opened/closed when an opto-magnetic disk 43 is loaded/unloaded. The opto-magnetic disk 43 is clamped on a turntable 44 by a clamper 48 and is rotated by a spindle motor arranged in a head frame 45. An optical head 46 is radially moved along a guide 49. The opto-magnetic disk 43 is irradiated with a light beam from the head 46 to record information therein. A magnet 47 is integrally arranged with the optical head 46 to apply a bias magnetic field to the disk 43 and is radially moved together with the optical head 46. With the above arrangement, although the size of the magnet 47 itself is small, the optical head 46 as a movable member becomes bulky, and high-speed access cannot be performed.

FIG. 2 is a schematic view showing another conventional opto-magnetic recording apparatus. The same reference numerals as in FIG. 1 denote the same parts in FIG. 2, and a detailed description thereof will be omitted. In this example, a bias magnet 47 is large enough to cover the radial recording area of an opto-magnetic disk 43 and is fixed on an upper cover 42 of the apparatus. The bias magnet 47 comes close to the opto-magnetic disk 43, as indicated by a broken line, when the upper cover 42 is closed. This example has a simple structure, but is applicable only to an apparatus with an upper cover. In this case, the loading/unloading aspect of such a medium is very important to synthesized with other information equipment. In particular, the height of the installation space is limited and the above-mentioned apparatus with an upper cover cannot be used when media other than the magnetic disk are utilized.

The opto-magnetic recording apparatus as described above is described, e.g., in Japanese Patent Laid-Open No. 147949/1985.

SUMMARY OF THE INVENTION

It is an object of the present invention to solve the conventional drawtacks described above and to provide an opto-magnetic recording apparatus requiring a small installation space and suitably synthesized with other information equipment.

In order to achieve the above object of the present invention, there is provided an opto-magnetic recording apparatus for radiating a light beam onto an opto-magnetic recording medium, while causing a magnetic field generating means arranged near the opto-magnetic recording medium to apply a bias magnetic field thereon, thereby recording information on the opto-magnetic recording medium, wherein the opto-magnetic medium is inserted in a direction substantially along a recording surface of the opto-magnetic recording medium, and there is provided a mechanism for removing the magnetic field generating means from an insertion path when the opto-magnetic recording medium is inserted.

With such an arrangement (so-called front loading), wherein the medium is inserted in the apparatus in a direction substantially along the recording surface, space saving can be achieved. In order to constitute a front loading arrangement, an insertion path of the medium must be assured in the apparatus. In this case, the apparatus, as a whole, tends to be bulky, and the bias magnetic field generating means arranged near the medium interferes with insertion of the recording medium. However, according to the present invention, the means for removing the magnetic field generating means from the insertion path when the medium is inserted is arranged to allow smooth insertion of the medium and effective utilization of the internal space.

DETAILED DESCRIPTION OF THE PREFERRED EMBODIMENTS

Preferred embodiments of the present invention will be described in detail with reference to the accompanying drawings.

Figure 1:
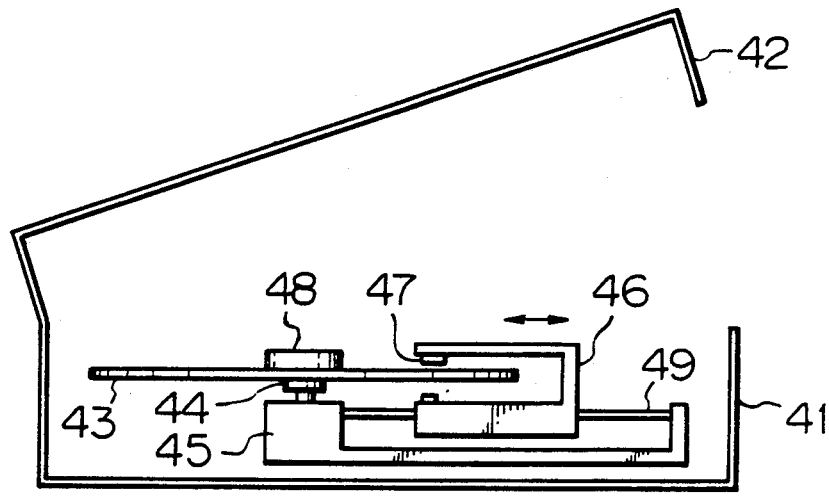
FIGS. 1 and 2 are, respectively, side sectional views showing arrangements of conventional opto-magnetic recording apparatuses.
Figure 2:
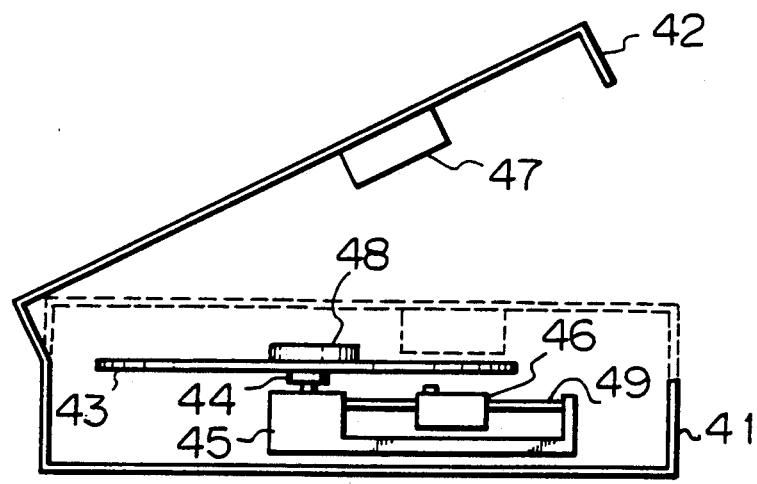
Figure 3A:
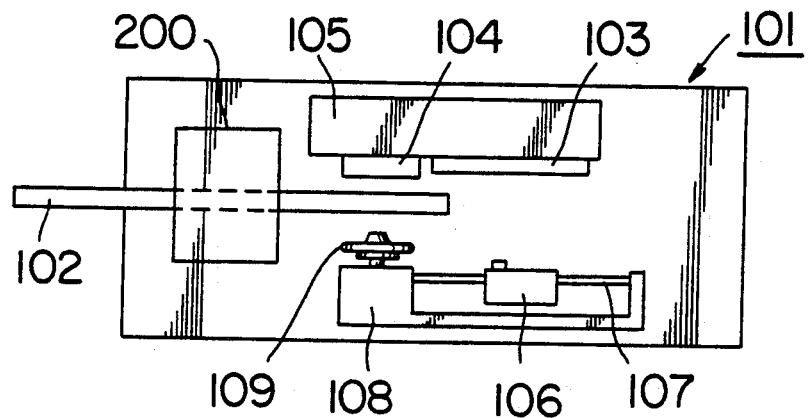
FIGS. 3A to 3C are side sectional views showing steps in inserting a medium in an opto-magnetic recording apparatus according to an embodiment of the present invention.
Figure 3B:
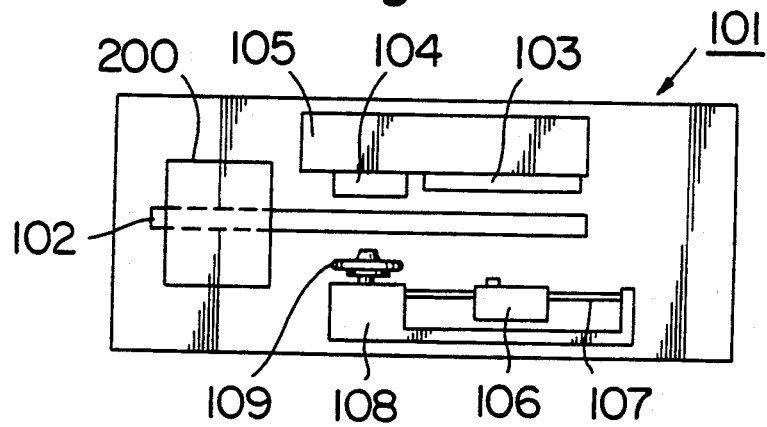
Figure 3C:
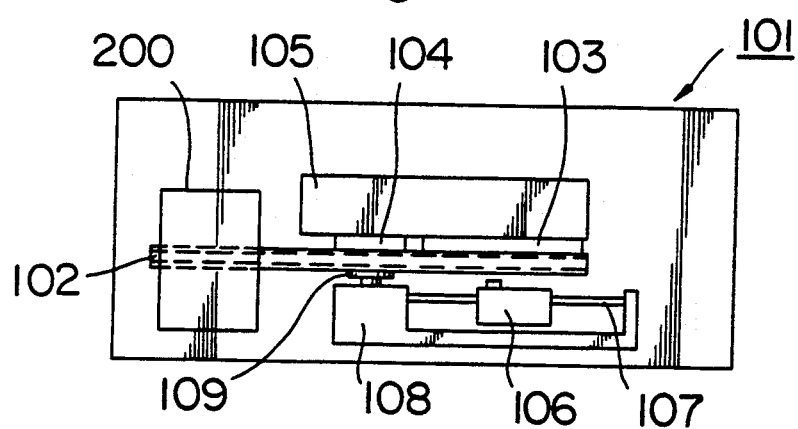

FIGS. 3A, 3B, and 3C are side sectional views showing an opto-magnetic disk apparatus 101 according to a first embodiment of the present invention. FIGS. 3A to 3C show states wherein a disk cartridge 102 is inserted and is then clamped to a spindle motor. The disk cartridge 102 contains an opto-magnetic disk therein. A bias magnet 103 and a clamp holder 104 are mounted on a mounting member 105. The mounting member 105 is vertically movable by a mechanism (not shown). An opto-magnetic head 106 is driven by a driving mechanism (not shown) and is guided along a guide 107 in the radial direction of the disk in disk cartridge 102.

A turntable 109 is rotated by a spindle motor mounted on a head frame 108.

When the disk cartridge 102 is inserted in the state shown in FIG. 3A, a loading mechanism 200 is actuated to translate the disk cartridge 102 to a position shown in FIG. 3B. The disk cartridge 102 is then moved downward to a position shown in FIG. 3C. As soon as the disk cartridge 102 is moved downward, the mounting member 105 is moved downward to the position shown in FIG. 3C. The disk in the disk cartridge 102 is urged against the turntable 109 and is clamped. At this time, the bias magnet 103 is separated from the disk by a distance of about 1 to 2 mm. When clamping of the disk and movement of the bias magnet are substantially simultaneously performed, the time required from loading to standby mode can be shortened.

The opto-magnetic disk is rewritable, as is well known, and is subjected to high-density recording. The opto-magnetic disk is the most promising medium which might replace magnetic disks. In order to replace the magnetic disk with the opto-magnetic disk, the size of the opto-magnetic disk apparatus must be reduced to, at least, a full-height size (height: 82 mm; width: 146 mm; and depth: 203 to 206 mm) of a 5.25" disk apparatus, as the most popular model for the magnetic disk. An embodiment of the present invention which is suitable for a compact (in particular, low profile) apparatus will be described below.

Figure 4A:
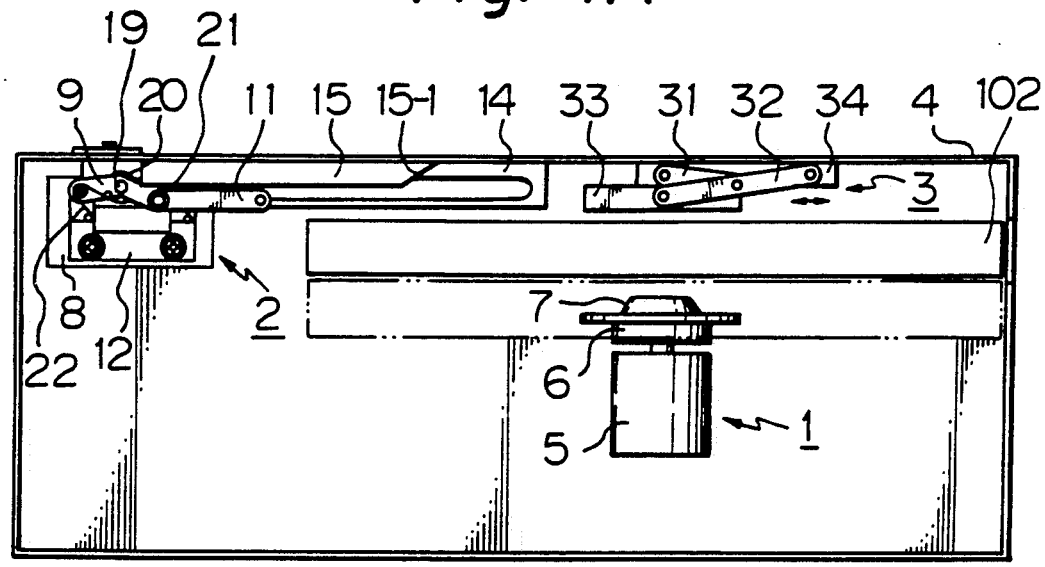
FIG. 4A is a side sectional view of an opto-magnetic recording apparatus according to another embodiment of the present invention.
Figure 4B:
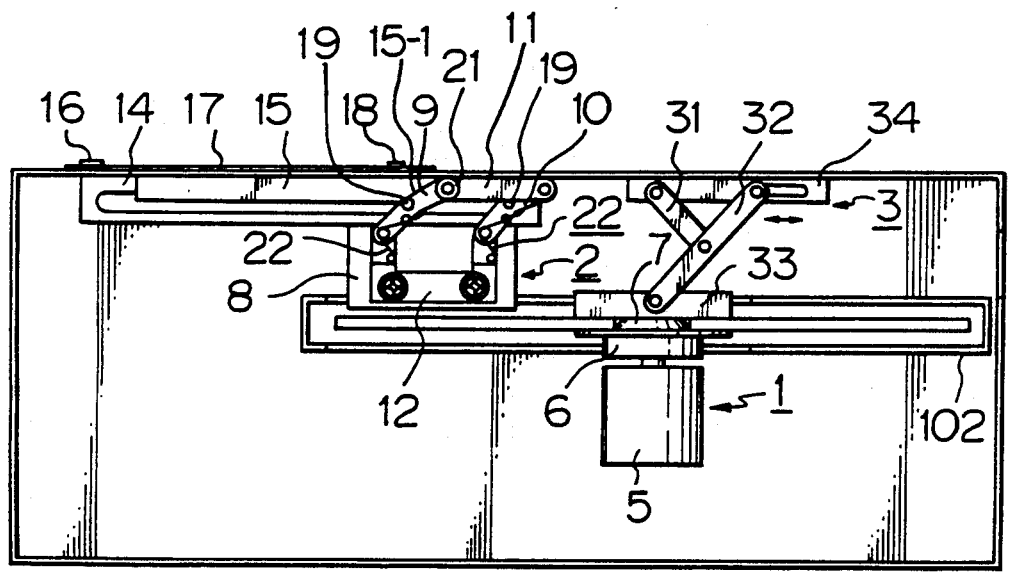
FIG. 4B is a side sectional view showing a state wherein a medium is clamped in the apparatus shown in FIG. 4A.
Figure 5:
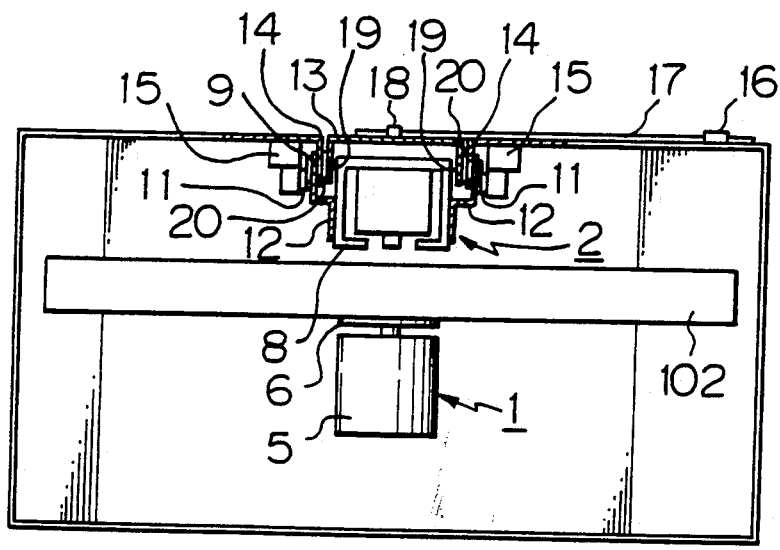
FIG. 5 is a front sectional view of the apparatus shown in FIG. 4A.

FIGS. 4A and 4B are side sectional views of a second embodiment of the present invention, and FIG. 5 is a sectional view of the apparatus of FIG. 4A and 4B when viewed from the left side in FIG. 4A. FIG. 4A shows a state wherein a disk cartridge is not yet moved downward during loading, and FIG. 4B shows a state wherein loading and clamping of the disk cartridge and the optical disk are completed.

The second embodiment will be described with reference to FIGS. 4A and 5. An apparatus of this embodiment comprises a spindle motor unit 1, a bias magnet unit 2, a clamping unit 3, and a frame 4. The spindle motor unit 1 comprises a spindle motor 5, a turntable 6 fixed on the rotating shaft of the spindle motor 5, and a taper cone 7 slidable on the rotating shaft of the spindle motor 5 and normally floating upward by an elastic force. The bias magnet unit 2 comprises a movable mechanism including: a bias magnet 8 and a first link plate 9; a second link plate 10 (FIG. 4B), a third link plate 11, and a coupling plate 12, which constitute a parallel link mechanism; and a slider 13. The stationary mechanism of the bias magnet unit 2 is constituted by inner and outer guides 14 and 15 disposed at both sides of the bias magnet 8. In a bias magnet driving mechanism, a lever 17 is rotated by a driving mechanism (not shown) about a pin 16 fixed on the frame 4. The lever 17 is engaged with a pin 18 and the pin 18 fixed on the slider 13 is moved to drive the bias magnet 8. The first ends of the first and second link plates 9 and 10 are pivotally supported by the coupling plate 12, and the second ends thereof are pivotally coupled to the third link plate 11. A rotating shaft fixed on the slider 13 extends through the central portions of the first and second link plates 9 and 10. A roller 20 fitted on the rotating shaft 19 is moved along the inner guide 14. Therefore, the slider 13 is linearly moved.

A roller 21 is provided to a coupling portion between the first and third link plates 9 and 11. The roller 21 is urged against ±:he outer guide 15 by the biasing force of a torsion spring 22 and the gravity of the bias magnet 8.

The clamping unit 3 comprises a fourth link plate 31, a fifth link plate 32, a clamper 33, and a clamp guide 34.

One end of the fourth link plate 31 is pivotally coupled to the clamp guide 34, and the other end thereof is pivotally coupled to the central portion of the fifth link plate 32. One end of the fifth link plate 32 is pivotally coupled to the clamper 33, and the other end is movable in a direction indicated by arrows in FIG. 4A. By driving the above mechanism, the clamper 33 is vertically moved to clamp the disk cartridge 102 on the turntable 6 and release the disk cartridge 102 therefrom, as indicated by the solid and broken lines. In loading, the disk cartridge 102 is moved in the horizontal direction and is moved downward to a position where the center of the disk is substantially aligned with the center of the turntable 6. When the disk cartridge 102 is moved downward, the clamper 33 is simultaneously moved downward. When the disk is placed on the turntable 6, the clamper 33 clamps the disk on the turntable 6. Movement of the bias magnet 8 is initiated upon completion of loading.

Clamping may be performed upon completion of loading. However, the procedures described above are preferable, since the disk can be rotated during movement of the bias magnet 8. Therefore, the time required from initiation of loading to the start of recording or reproduction can be advantageously shortened.

The slider 13 can be moved along the inner guide 14, but the roller 21 is moved following the shape of the outer guide 15. When the roller 21 rides on an inclined surface 15-1 of the outer guide 15, the roller 21 is moved upward. The bias magnet 8 is accordingly moved downward and is inserted in an opening of the disk cartridge 102 and is stopped at the position indicated in FIG. 4B.

The electromagnet is driven as follows. The magnet is pivoted about the pin 18 fixed on the slider 13 and the pin 16. In this case, the lever 17 having an elongated hole engaged with the pin 18 is used as a transmitting means and is driven by a motor (not shown). However, another transmitting/driving means, such as a wire, or a pinion/rack assembly may be used. In the above embodiment, the slider 13 is driven to move the magnet 8. However, the bias magnet 8 may be directly driven.

Figure 6:
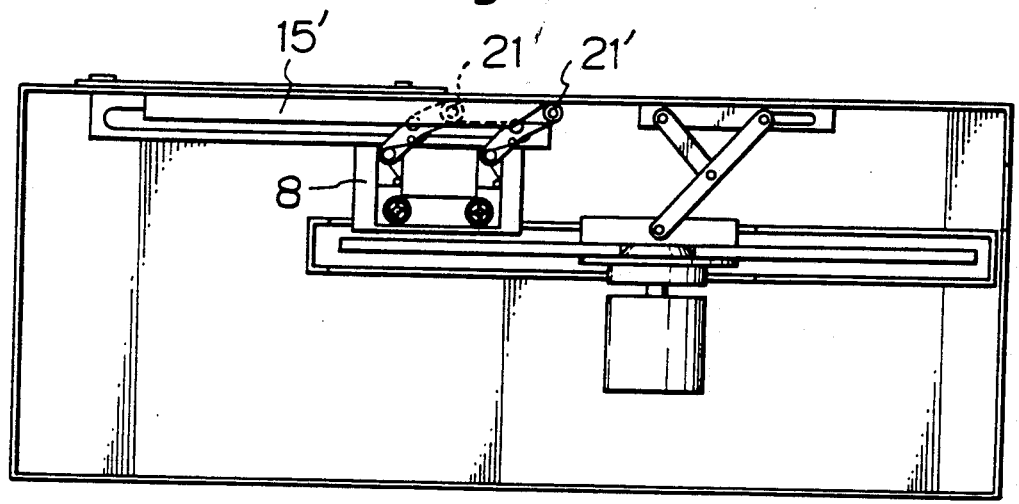
FIGS. 6 and 7 are, respectively, a side front view and a schematic view of the main part of a modification of a magnet driving mechanism in the apparatus shown in FIG. 4A.

In the above embodiment, the third link plate 11, the slider 13, and the coupling plate 12 constitute a double parallel link mechanism. However, a single parallel link mechanism may be used. More specifically, the third link plate 11 or the slider 13 may be omitted. The roller 21 is mounted on one end of the third link plate 11. However, as shown in FIG. 6, a roller 21' may be mounted on the other end of the third link plate 11. In this case, the roller 21' is longer than the roller 21. Two inclined surfaces, respectively corresponding to the rollers 21 and 21' are formed on an outer guide 15'. A step is formed to prevent the roller 21' from riding on the left inclined surface of FIG. 6. With the above arrangement, even if a slight impedance occurs in the pivot portion of the parallel link mechanism, the bias magnet 8 can be vertically moved.

Figure 7:
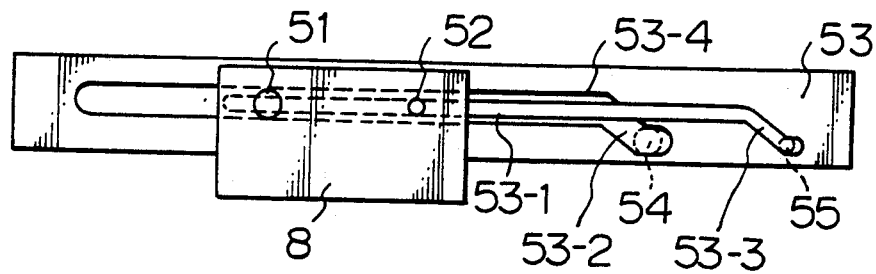

FIG. 7 shows the main part of a modification of the magnet driving means of the second embodiment.

Two pins 51 and 52 extend from the bias magnet 8. The pin 52 is longer than the pin 51, and the diameter of the pin 52 is smaller than that of the pin 51. Grooves are formed in a guide 53. Grooves 53-1 and 53-3 are deeper than grooves 53-2 and 53-4. For this reason, when the bias magnet 8 can be moved to an actuation position without impedance, the pin 52 is moved to a position 55, without being inserted in the groove 53-2. Since the pin 51 is shorter than the pin 52, the pin 51 is inserted in the groove 53-2 and is stopped at a position 54.

In the second embodiment, the magnetic field generating means is located behind the medium insertion path, and the apparatus can have a low profile.

The present invention is not limited to the particular embodiments described above. Various changes and modifications may be made, without departing from the scope of the appended claims.

I claim:

1. An opto-magnetic recording apparatus comprising:
    loading means for loading a recording medium through a side of said recording apparatus, from an insertion position to a recording position along an insertion path substantially parallel to a recording surface of the medium;
    an optical head for applying a light beam to the medium in the recording position;
    magnetic field generating means for applying a magnetic field to the medium in the recording position;
    driving means for receiving the recording medium from said loading means and for moving the medium relative to the light beam in the recording position;
    a clamp mechanism for clamping the medium having been carried by said loading means to said driving means; and
    a moving mechanism associated with said clamp mechanism for moving said magnetic field generating means in at least a direction substantially perpendicular to the recording surface of the medium and for maintaining a surface of said magnetic field generating means substantially parallel to the recording surface of the medium, said moving mechanism for moving said magnetic field generating means away from the insertion path of the medium during loading of the medium, and for moving said magnetic field generating means to a position near the recording surface of the medium when the medium is clamped by said clamp mechanism.

2. An apparatus according to claim 1, wherein said moving mechanism comprises a parallel link mechanism.

3. An apparatus according to claim 1, wherein said moving mechanism comprises a slider means movable in a direction along the recording surface of the medium, and a parallel link mechanism for coupling said magnetic field generating means to said slider means to move said magnetic field generating means in the direction substantially perpendicular to the recording surface.

4. An apparatus according to claim 1, wherein said magnetic field generating means comprises a permanent magnet.

5. An opto-magnetic recording apparatus comprising:
    loading means for loading a recording medium through a side of said recording apparatus, from an insertion position to a recording position along an insertion path substantially parallel to a recording surface of the medium;
    an optical head for applying a light beam to the medium in the recording position;
    magnetic field generating means for applying a magnetic field to the medium in the recording position; and
    a parallel link mechanism associated with said loading means for moving said magnetic field generating means in at least a direction substantially perpendicular to the recording surface of the medium and for maintaining a surface of said magnetic field generating means substantially parallel to the recording surface of the medium, said parallel link mechanism for moving said magnetic field generating means away from the insertion path of the medium during loading of the medium, and for moving said magnetic field generating means to a position near the recording surface of the medium when the medium is in the recording position.

6. An apparatus according to claim 5, further comprising slider means for carrying said parallel link mechanism and being movable in the direction along the recording surface of the medium.

7. An apparatus according to claim 5, wherein said magnetic field generating means comprises a permanent magnet.

* * * * *

UNITED STATES PATENT AND TRADEMARK OFFICE
CERTIFICATE OF CORRECTION

PATENT NO. : 4,993,009

DATED : February 12, 1991

INVENTOR(S) : Makoto Shiho

It is certified that error appears in the above-identified patent and that said Letters Patent is hereby corrected as shown below:

COLUMN 1

Line 41, "readout" should read --read out--.

COLUMN 2

Line 8, "synthesized" should read --synthesize--;
    Line 19, "drawtacks" should read --drawbacks--.

COLUMN 4

Line 19, "±:he" should read --the--.

Signed and Sealed this

Twelfth Day of November, 1991

Attest:

HARRY F. MANBECK, JR.

*Attesting Officer*      *Commissioner of Patents and Trademarks*